Feb. 21, 1933.                J. R. MALCOLM                1,898,783
PROCESS AND APPARATUS FOR DEVELOPING MOVING PICTURE FILM
Filed May 29, 1929
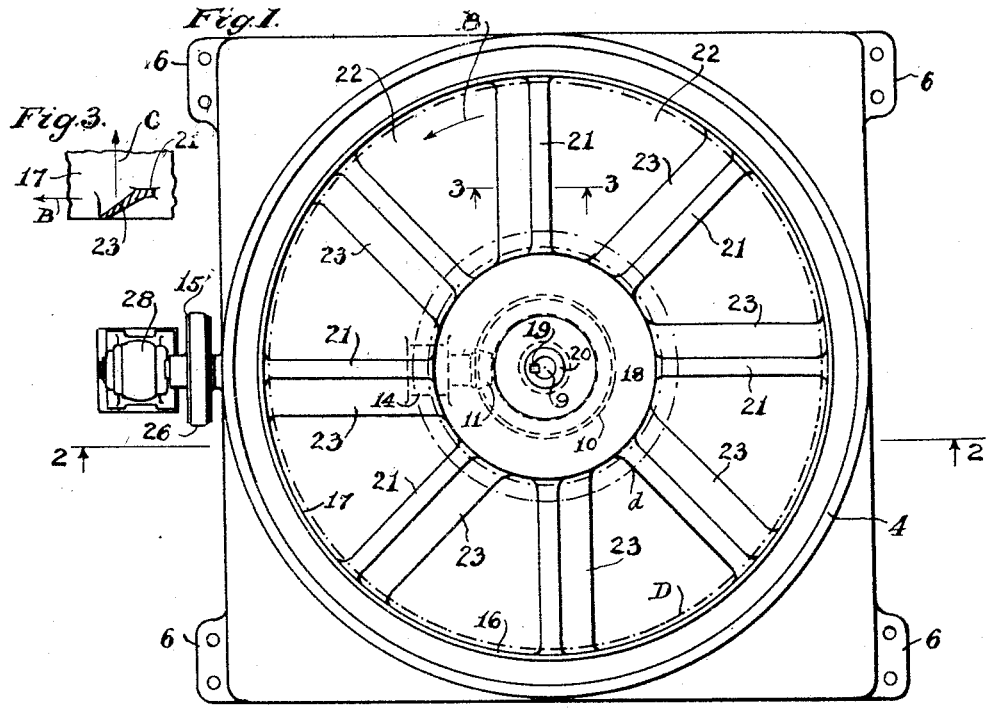
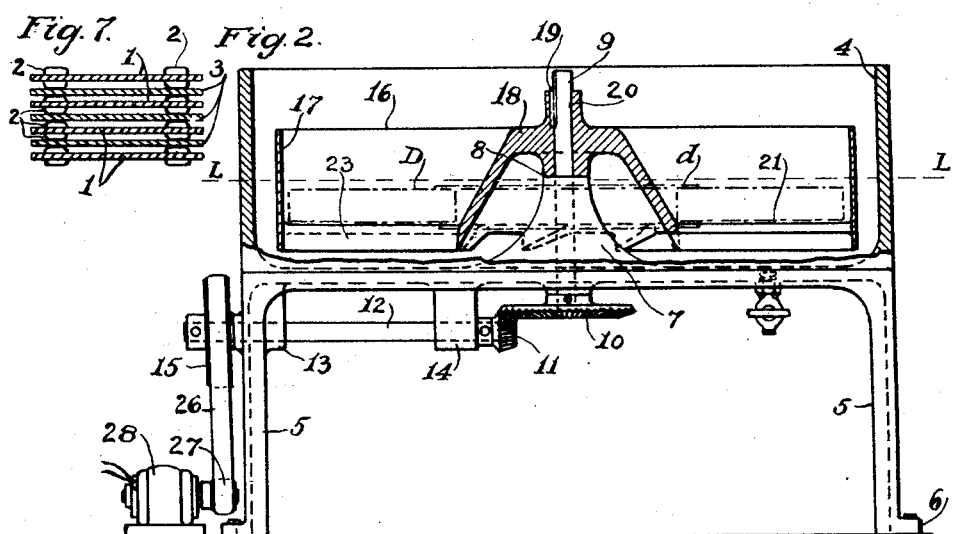
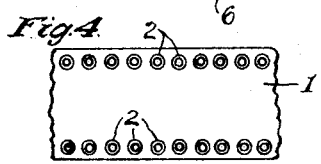
INVENTOR
Joseph Rice Malcolm
BY
Harold E. Penney,
ATTORNEY Patented Feb. 21, 1933

1,898,783

UNITED STATES PATENT OFFICE

JOSEPH RICE MALCOLM, OF NEW YORK, N. Y.

PROCESS AND APPARATUS FOR DEVELOPING MOVING PICTURE FILM

Application filed May 29, 1929. Serial No. 366,951.

The present invention relates to an improvement in method of handling and developing moving picture film in extended lengths, and has for its principal object the provision of means whereby moving picture film may be readily set up in a compact unit and thereafter so handled in the subsequent development, fixing and drying thereof.

The invention further relates to an improvement in the apparatus for processing of the film, wherein film of great length, running into hundreds of feet or over, may be compactly and readily handled during the subsequent treating and drying steps, after exposure, the film being simultaneously processed, in its entirety, as a single unit.

A further object of the invention is to provide means for holding said film, in great lengths, during such processing in such a manner as to allow the film to be held or gripped in a film enshrouding or holding device, so that both the back and front face of the film will be clear of any supporting contact except at points along the edges of the film and at, or adjacent, the sprocket hole sections thereof.

A further object is the provision of a novel form of film gripping means whereby subsequent treatment of the film during the developing, rinsing, fixing and drying may all be conducted while the film is held in the gripping means, hereinafter referred to as a film shroud.

A further object is the improvement in a film shroud which may be made of any suitable material, such as a thin strip of metal not affected by chemicals in which the film is treated, or it may be of a thin strip of celluloid or similar material, said shroud being of a suitable width, approximating the width of the picture film which it enshrouds and being of a single, continuous length, long enough to encompass and enshroud any given length of film.

The film shroud may be further provided along its edges with film gripping means for holding the film, in spaced relation, for freedom of treatment or processing exposure on both sides thereof when so gripped, and such gripping means may be in the form of double headed, spaced eyelets which extend outwardly from both faces of the film shroud, or as in the case of a metal film shroud, film gripping spaced contacts or protrusions may be pressed up upon both faces so as to extend on opposite sides of said film shroud, thereby to hold an interposed film in spaced relation thereto and clear of contact on both faces thereof except at the gripping points.

A further object is to provide, in a film shroud, a plurality of spaced film holding gripping means along both edges of said shroud in such a manner as to contact with the film only at the outer edges thereof, allowing of full flexible freedom of the shroud and thus contact with the film only at such points near the sprocket holes thereof which are free and out of the plane of the picture zone of said moving picture film.

A further object is the provision of means in a developing tank whereby the enshrouded film and holder may be readily held in such machine, and the provision in such machine of means for causing an agitation and flow of liquid chemicals through the enshrouded film during movement of the same in the means therefor provided.

These and other capabilities will be apprehended as the herein description proceeds, and it is obvious that modifications may be made in the herein process without departing from the spirit thereof or the scope of the appended claims.

In the drawing:

Fig. 1 is a plan view of a shroud film treating machine.

Fig. 2 is a sectional view thereof, taken on the line 2—2, Fig. 1, looking in the direction of the arrows.

Fig. 3 is a fragmentary sectional view taken across one of the arms of the rotary spider in Fig. 1, taken on the line 3—3, looking in the direction of the arrows.

Fig. 4 is a plan view of a fragment of a film shroud.

Fig. 5 is an edge view thereof.

Fig. 6 is a fragmentary view of a film shroud carrying a moving picture film therebetween.

Fig. 7 is an enlarged, transverse sectional view of any section of a film shroud showing the manner of gripping the film therebetween.

In order to carry out the method herein disclosed, I provide a shroud, a portion of which is shown in plan and edge elevation in Figs. 4 and 5 respectively, and this comprises a strip of material 1, of suitable thinness to allow it to be easily rolled upon a film carrying reel and the like. In width this shroud may be substantially identical with the standard moving picture film, and is provided near its opposite edges with a series of film gripping and spacing protuberances 2 which extend from both faces of the shroud member 1, Fig. 5.

The shroud may be made of strip celluloid and the gripping protuberances mounted thereon in the form of eyelets. Many kinds of metals may be used for this purpose which are not reactive to the chemicals used in photographic work.

With the construction of a film shroud and with the protuberances 2 being spaced closely together, as indicated, it is possible to reel an exposed moving picture film into the shroud upon a suitable short flanged reel $d$, shown dotted in Fig. 2, for the purpose, and with the shroud of sufficient length to entirely encompass and hold the film therein, the film will be gripped along its sprocket hole edges by the plural closely spaced protuberances 2. This is indicated in Fig. 6 which is the edge view of a fragment of a reeled moving picture film and the shroud, in which the film is shown loosely caught between the protuberances 2 of the shroud and held therebetween, the film so held not being touched at any place except at the points where they are grasped and held by the protuberances 2. Thus, the film is held spaced apart and out of contact except along spaced gripping point contacts at its outer edges.

In Fig. 6 the film is shown slightly separated from the shroud for clearness of showing, but in Fig. 7 there is an enlarged transverse section of a fragment of a reeled up enshrouded film showing how the protuberances 2 rigidly hold and space apart the film 3 without surface contact except as herein described.

Thus, it is obvious that an exposed lengthy film of any reasonable or desired length may be readily enshrouded and built up into a roll-like unit and thus form, ultimately, a large narrow roll of enshrouded film which throughout its entire rolled diameter is provided with a large plurality of interstices through which the customary chemicals used in the treatment of the film may be readily passed without obstruction, back or front, except at the edge points of such film where such gripping contact will do no harm to the film during processing, or the finished, dried product.

After a film has been reeled into a roll and enshrouded, as described, it forms a large diametered narrow roll of great self stability, and it may then be placed into an apparatus for the development of the pictures thereon, and this will now be described.

In Figs. 1 and 2, there is shown one form of processing machine which comprises, in the main, a cylindrical walled tub 4 which is open only at the top and at the four corners of which are attached supporting legs 5, the feet 6 of which are provided with holes for attachment to the floor, as shown.

The tub is provided at its center, above the bottom, as shown, with an upstanding, preferably cone shaped, bearing 7, the height of which, at the line of intersection at the platform top of the bearing, as at 8, is above the liquid level L, Fig. 2. The interior of the tub 4 and its bearing 7 may be coated with any suitable compound to prevent chemical reaction during processing of the film.

Mounted in the bearing is a vertically upstanding central shaft 9, to the lower end of which is mounted a bevel gear 10 which in turn meshes with a bevel pinion 11 which is carried on a drive shaft 12 which is suitably mounted in bearings 13 and 14, so that upon rotation of the drive shaft 12, the central or spider shaft 9 will be slowly rotated.

The drive shaft 12 is driven in turn by a belt drive comprising a pulley 15 on shaft 12, and belt 26 which is in driving connection with a motor driven pulley 27, this in turn being driven by the primed motive unit, such as an electric motor 28.

As a means for supporting the enshrouded roll of film to be treated, the tub is provided with a spider 16 comprising an upstanding outer rim 17 and a driving conical hub 18 for guiding and holding the film reel $d$, to a central position, and which is shown in Fig. 2. The spider 16 may be suitably keyed to the spider shaft 9, as indicated, by the driving key 19 in Fig. 2, such key fitting splined ways in both the shaft 9 and the extension 20 of the hub 18.

The hub 18 of the spider 16 is connected to its outer rim 17 by a plurality of spider arms or fluid agitating bars 21, these being best shown in Fig. 1, thereby leaving large open spaces 22 between the arms or agitating bars 21. Along and at one side of the lower face of said arms, is an angularly downwardly inclined forwardly extending fluid elevating web 23, this being shown in Fig. 3, this being a section of one of the arms or bars 21, taken on the section line 3—3, Fig. 1, looking in the direction of the arrows.

When the reel spider 16 is revolved in the direction of the arrow B, Fig. 1, and with the film treating solution in the tank to the level L, as in Fig. 2, the said rotation of the spider causes the fluid therein to be constantly moved upwardly in the direction of the arrow C, Fig. 3, due to the angular inclination of the webs 23. Thus, as indicated at D, Fig. 2, wherein is shown in dotted line construction a wound up shroud 1—2 and a film 3 resting upon the top surface of the agitating arms or bars 21. The rotary movement of the spider 16 causes the film treating fluid to rise upwardly into contact with the enshrouded film and through the interstices therebetween and causes a constantly agitated flow movement of the developing, fixing or rinsing fluid therein, and this slow rotary movement of the reel spider 16 and reeled film D continues until the chemical treatment has been completed, after which the enshrouded roll of film D may be removed and placed into another similar apparatus in which a different solution, or clear water, may be placed, and the processing continued either for rinsing, or fixing, and thereafter again rinsing in the usual manner.

After the enshrouded film has become finally processed and washed of all fixing solution, by rinsing, the film roll D may then be set up, still in rolled form, in a current of drying air and the film finally dried while still enshrouded in roll form. Upon completion of the drying operation, the negative film and its encompassing shroud may thereafter be separated and the negative is then ready for the next step.

Thus, it will be noted that I have developed an improved system for the treatment of long lengths of moving picture film from the exposed film and through the various steps of processing to the drying thereof while the film is enshrouded or carried in a rolled up form between a shroud of the kind herein disclosed and in which shroud the film is carried in a spaced, unitary operative position therein whereby it may be processed and treated throughout the various steps of treatment up to and including the drying thereof without the removal of the film from its engaging shroud until completion of the dried negative.

It is obvious that this improvement does away with the larger apparatus now in use for the same purpose, requires a much smaller space for such treatment than current practice and at the same time permits the performance of the desired work thereon in a practical manner and with greater economy, in many phases, than heretofore.

What I claim is:

1. In a process of treating moving picture films the part process consisting in winding a film on a shroud in a way to keep both sides of said shroud and said film spaced from each other, then consecutively immersing and revolving said enshrouded rolled film in a sequence of solutions, for developing, fixing and rinsing said film, and simultaneously circulating said solutions through the spaces enclosed by the convolutions of said shroud and film, then drying the enshrouded rolled film, and then separating said shroud and dried film.

2. In an apparatus for developing, fixing and rinsing moving picture films a tank, for enclosing therein a film treating solution, a spider, revolvably mounted in said tank, for supporting thereon a coiled enshrouded film, having the rectilinear elements thereof substantially vertically disposed, and having its successive convolutions spaced from each other and from said shroud, leaving therebetween substantially vertically disposed narrow coiled spaces, multiple arms on said spider, means for revolving said spider and means on said arms for producing, when revolved, substantially vertically directed currents, for circulating said solution through said coiled spaces, whereby said solution is caused effectively to act on said films.

3. The elements of claim 2, said current producing means consisting of inclined webs on said arms, disposed to produce said currents by the rotation of the said arms with said webs thereon.

4. In an apparatus for developing, fixing or rinsing a film, the latter being carried in enshrouded condition on a film reel; a fluid containing receptacle having a bearing hub extending above said fluid; a central rotary shaft projecting upwardly into said receptacle, a motor and reducing gear connections for driving said shaft; a rotary film supporting spider on said shaft and having a conical hub for guiding and holding said reel to a central position, said spider also having radial arms provided with forwardly and downwardly inclined faces terminating in sharp leading edges to force said fluid upwardly through and in contact with the shrouded film.

5. In an apparatus comprising a coiled strip of material for carrying between the convolutions thereof and in spaced relation therewith a moving picture film, a solution container, a spider revolvably mounted in said container and including multiple arms for carrying said coiled strip, means including said arms for producing currents in the solution during revolution of the spider, and webs carried by said arms and inclined downwardly and forwardly therefrom, whereby to direct the currents upwardly between said convolutions for treating opposite sides of the film.

6. In a film treating apparatus, a liquid containing tank, a hub rising from the bottom of said tank and having a bearing platform disposed above the liquid level, a revolvable spider having a hub mounted on said platform and extending below the liquid level, arms extending from said latter hub for carrying a film in the liquid, and a shaft journalled in said first hub and rigid with said second hub for revolving said spider.

7. In a film treating apparatus, a liquid containing tank, a hub rising from the bottom of said tank and having a bearing platform disposed above the liquid level, a revolvable spider having a hub mounted on said platform and extending below said level, arms extending from said latter hub for carrying a film in the liquid, a vertically disposed shaft revolvably mounted in said first hub and extending into said second hub, and a key attaching said last mentioned hub and said shaft, whereby revolution of the latter may revolve said hub with the film.

8. In a film treating apparatus, a liquid containing tank, supporting legs therefor, a hub rising from the bottom of said tank and having a bearing platform disposed above the liquid level, a revolvable spider having a hub mounted on said platform and extending below said level, arms extending from said latter hub for carrying a film in the liquid, a vertically disposed shaft revolvably mounted in said first hub and having one of its ends disposed in fixed relation with said second hub, said shaft having its opposite end disposed below said bottom, and means disposed below the plane of said bottom and cooperating with said last mentioned end for revolving said shaft together with said spider.

9. In a film treating apparatus, a liquid containing tank including a bottom, supporting means therefor, a hub rising from said bottom and having a bearing platform disposed above the liquid level, a revolvable spider having a hub mounted on said platform and extending below said level, arms extending from said latter hub for carrying a film in the liquid, a vertically disposed shaft revolvably mounted in said first hub and having one of its ends disposed in said second hub, attaching means for said end and its cooperating hub, said shaft having its opposite end disposed below said bottom, a gear carried by said last mentioned end, another shaft carried by said bottom and having thereon and in mesh with said first gear another gear, a motor having also a shaft, and means including a flexible element connecting said last mentioned shaft and said second shaft, whereby to revolve said first shaft and said spider.

Signed at New York in the county of New York and State of New York this 25th day of May A. D. 1929.

JOSEPH RICE MALCOLM.